(12) United States Patent
Pachov

(10) Patent No.: US 8,925,412 B2
(45) Date of Patent: Jan. 6, 2015

(54) SAFETY SYSTEM

(76) Inventor: Yavor Pachov, Villeurbanne (FR)

( * ) Notice: Subject to any disclaimer, the term of this patent is extended or adjusted under 35 U.S.C. 154(b) by 212 days.

(21) Appl. No.: 13/453,526

(22) Filed: Apr. 23, 2012

(65) Prior Publication Data

US 2012/0240707 A1   Sep. 27, 2012

Related U.S. Application Data

(63) Continuation-in-part of application No. 11/959,498, filed on Dec. 19, 2007, now abandoned, which is a continuation-in-part of application No. 10/694,808, filed on Oct. 29, 2003, now Pat. No. 7,331,252.

(51) Int. Cl.

| | | |
|---|---|---|
| *F16H 35/10* | (2006.01) | |
| *B66D 1/14* | (2006.01) | |
| *B66D 1/54* | (2006.01) | |
| *B66D 5/02* | (2006.01) | |
| *B66D 5/22* | (2006.01) | |
| *B66D 5/30* | (2006.01) | |
| *F16D 63/00* | (2006.01) | |
| *F16H 1/16* | (2006.01) | |
| *B60T 11/04* | (2006.01) | |
| *F16D 121/24* | (2012.01) | |
| *F16D 125/52* | (2012.01) | |
| *F16D 127/06* | (2012.01) | |

(52) U.S. Cl.
CPC .. *B66D 1/14* (2013.01); *B66D 1/54* (2013.01); *B66D 5/026* (2013.01); *B66D 5/22* (2013.01); *B66D 5/30* (2013.01); *F16D 63/00* (2013.01); *F16H 1/16* (2013.01); *F16H 35/10* (2013.01); *B60T 11/04* (2013.01); *F16D 2121/24* (2013.01); *F16D 2125/52* (2013.01); *F16D 2127/06* (2013.01)
USPC .................................................. 74/412 TA

(58) Field of Classification Search
USPC .............................................. 74/425, 412 TA
See application file for complete search history.

(56) References Cited

U.S. PATENT DOCUMENTS

| | | | |
|---|---|---|---|
| 1,427,025 A | | 8/1922 | Schlafly |
| 2,348,734 A | | 5/1944 | Freeman |
| 2,377,014 A | | 5/1945 | Keller |
| 2,713,401 A | | 7/1955 | Serste et al. |
| 2,781,191 A | | 2/1957 | Pickles |
| 2,851,137 A | * | 9/1958 | Gravenstine ............... 192/223.3 |
| 3,059,485 A | | 10/1962 | Bohlman et al. |

(Continued)

FOREIGN PATENT DOCUMENTS

| | | |
|---|---|---|
| DE | 297 02 062 U1 | 3/1997 |
| EP | 0 869 295 A2 | 10/1998 |

*Primary Examiner* — Justin Krause
(74) *Attorney, Agent, or Firm* — Young & Thompson

(57) ABSTRACT

This safety system includes:
  a toothed wheel, connected rotationally with respect to at least one rotating member to be braked,
  a worm driven rotationally by a motor upon rotation of the rotating member and permanently in mesh with the toothed wheel,
  a housing forming:
    a longitudinal wall located on the side of the worm diametrically opposed to the toothed wheel, and extending along the worm at a distance of the latter ranging between 0.001 and 0.01 times the diameter of the worm, and
    a first end wall integral with the longitudinal wall, located opposite a first longitudinal end of the worm; and
  energy absorption/dissipation elements interposed between the first end wall and the first longitudinal end of the worm, the worm being slidingly mounted in the housing such that the first longitudinal end of the worm comes closer to the first end wall when the worm slides in the housing.

20 Claims, 11 Drawing Sheets

(56) References Cited

U.S. PATENT DOCUMENTS

| | | |
|---|---|---|
| 4,023,430 A | 5/1977 | Imamura |
| 4,080,849 A | 3/1978 | Benjamin et al. |
| 4,625,946 A | 12/1986 | Clark, Jr. et al. |
| 5,005,777 A | 4/1991 | Fernandez |
| 5,144,849 A | 9/1992 | Aihara et al. |
| 5,727,664 A | 3/1998 | Chico |
| 5,834,662 A | 11/1998 | Stoll et al. |
| 5,931,438 A | 8/1999 | Brouwer |
| 6,352,143 B1 | 3/2002 | Niaura et al. |

* cited by examiner

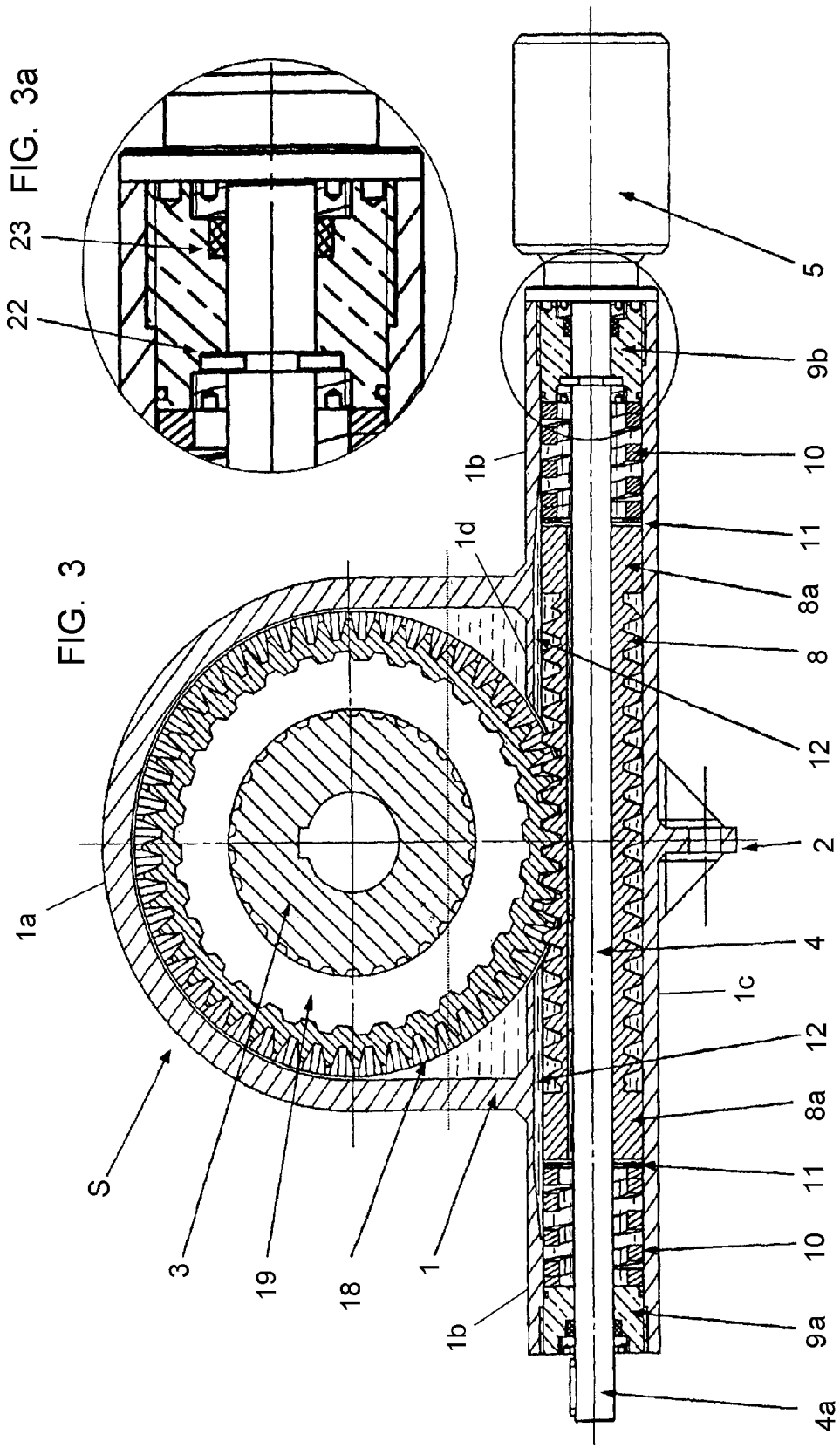

A-A FIG. 4

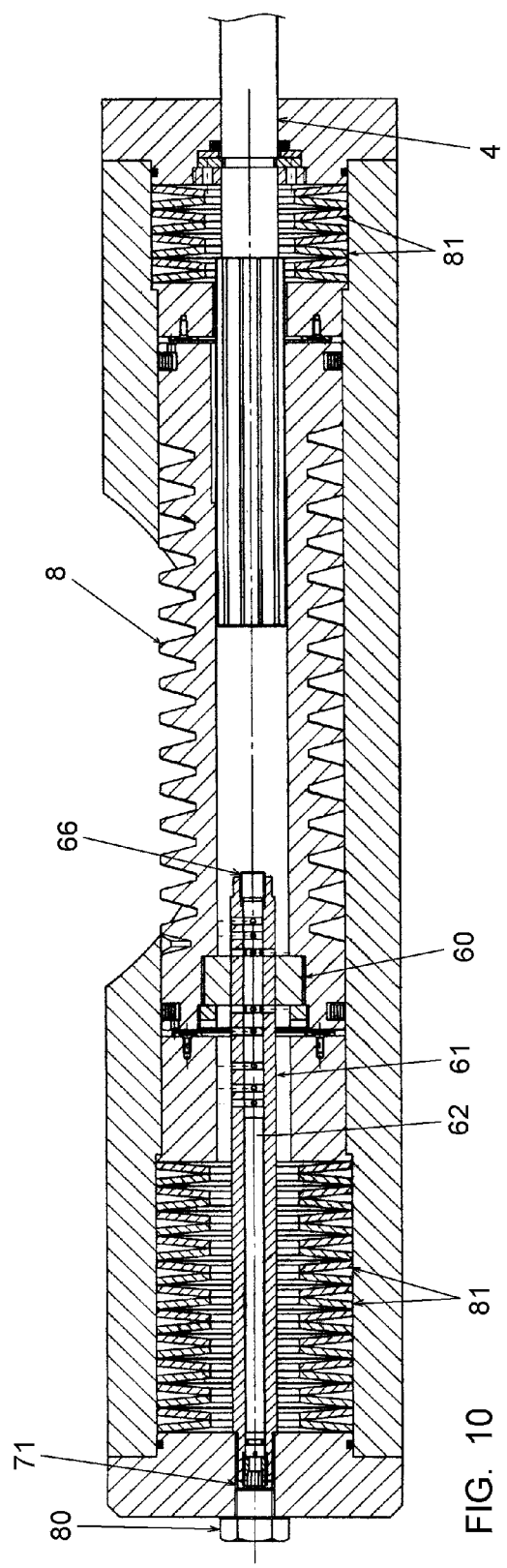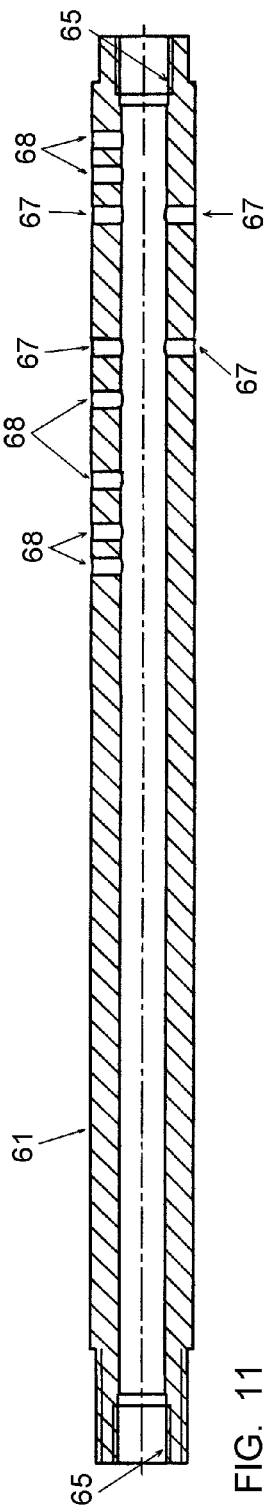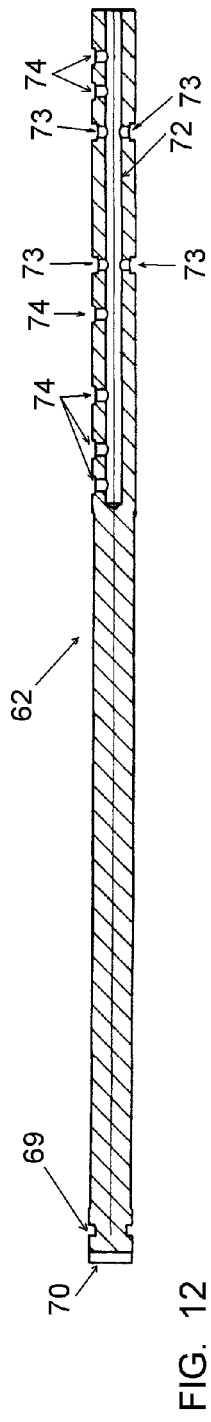
FIG. 10
FIG. 11
FIG. 12

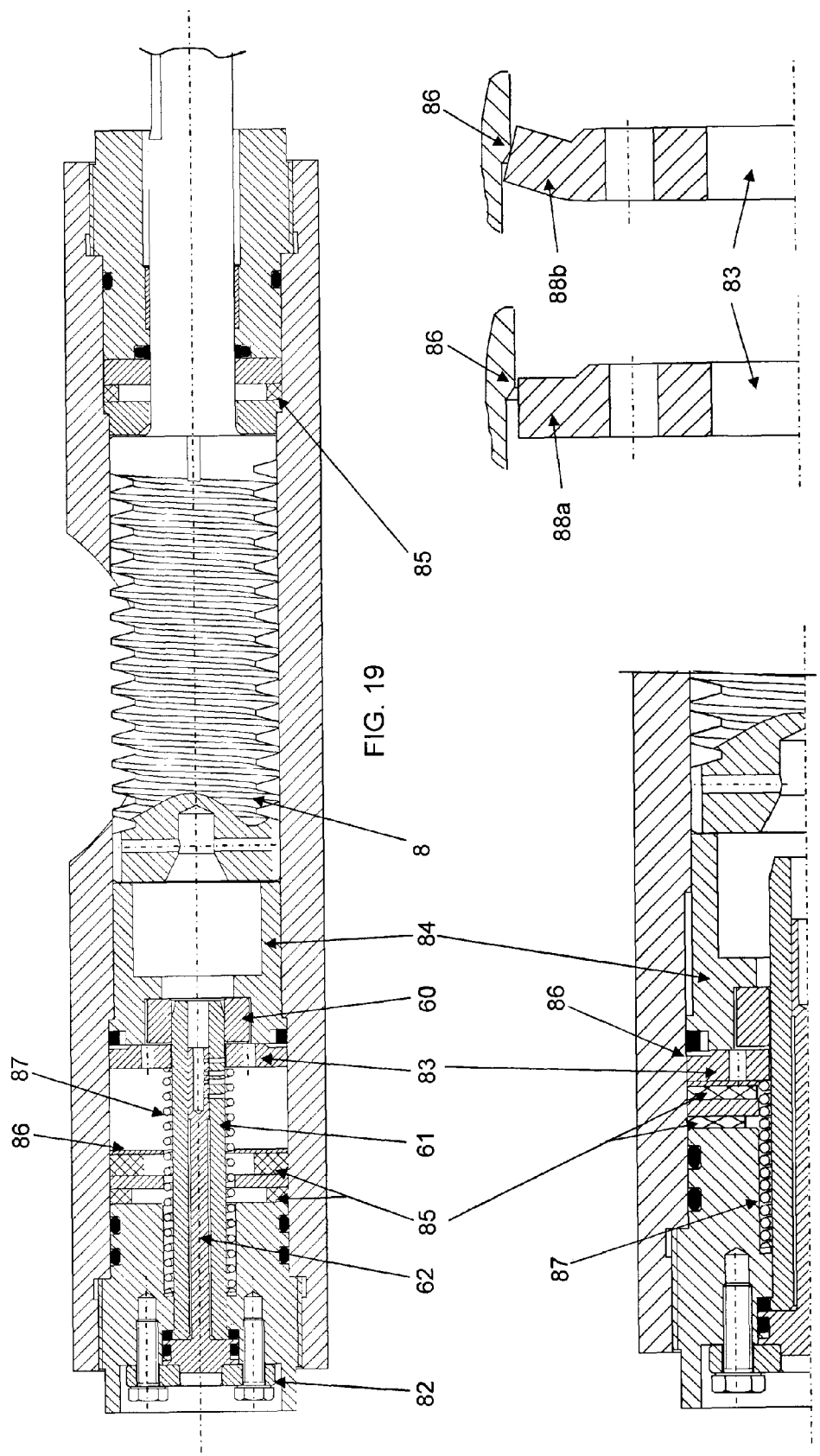

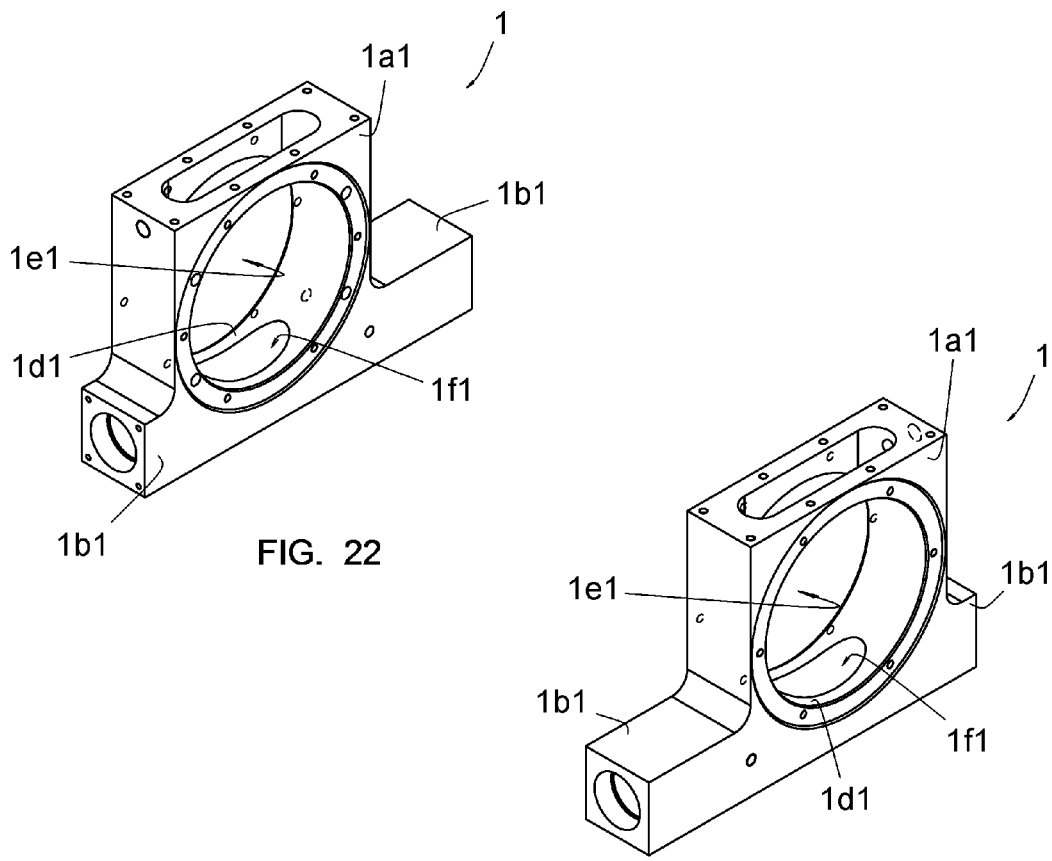
FIG. 22
FIG. 23
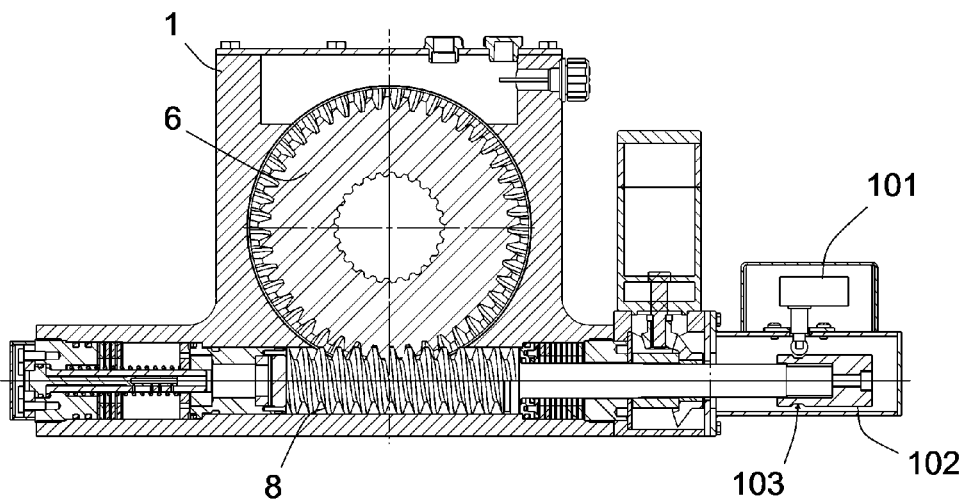
FIG. 24

SAFETY SYSTEM

CROSS-REFERENCE TO RELATED APPLICATIONS

This application is a continuation-in-part of copending application Ser. No. 11/959,498 filed on Dec. 19, 2007; which is a continuation-in-part of application Ser. No. 10/694,808, filed Oct. 29, 2003, now U.S. Pat. No. 7,331,252. The entire contents of each of the above-identified applications are hereby incorporated by reference.

BACKGROUND OF THE INVENTION

1. Field of the Invention

The present invention relates to a safety system, intended to be fitted to a mechanism comprising one or more members over which it is important to maintain control in all circumstances, in particular for safety reasons. In an advantageous application, the system according to the invention is used to brake the winding drum of a winch or similar mechanism, in the event of a failure in this winch, in particular a failure of the members for driving the drum.

2. Related Art

U.S. Pat. No. 4,625,946 describe safety systems for hoisting machinery, comprising a toothed wheel connected rotationally to the rotating member to be braked, and a worm driven rotationally by a motor and permanently in mesh with the toothed wheel.

The worm drive motor allows the safety system to follow the movement of the rotating member to which the toothed wheel is connected. In the event of a failure, this toothed wheel drives the worm, thereby generating friction between its teeth and the thread of this worm, which locks up the toothed wheel to prevent dropping of the load. The present invention relates to a safety system, intended to be fitted to a mechanism comprising one or more members over which it is important to maintain control in all circumstances, in particular for safety reasons. In an advantageous application, the system according to the invention is used to brake the winding drum of a winch or similar mechanism, in the event of a failure in this winch, in particular a failure of the members for driving the drum.

U.S. Pat. No. 4,625,946 describe safety systems for hoisting machinery, comprising a toothed wheel connected rotationally to the rotating member to be braked, and a worm driven rotationally by a motor and permanently in mesh with the toothed wheel.

The worm drive motor allows the safety system to follow the movement of the rotating member to which the toothed wheel is connected. In the event of a failure, this toothed wheel drives the worm, thereby generating friction between its teeth and the thread of this worm, which locks up the toothed wheel to prevent dropping of the load.

It turns out that a failure of the safety system is possibly to be feared in certain situations. In fact, depending on the speeds and inertia of the load and the rotating members(s) to brake, the braking stress is sudden and intense.

SUMMARY OF THE INVENTION

The present invention provides an improved design of the worm and his casing, in order to withstand the stress generated during the lock up and to directly transform the efforts into useful efforts in regard of the braking function.

The system according to the invention comprises:
a toothed wheel, connected rotationally with respect to at least one rotating member to be braked,
a worm having a diameter, driven rotationally by a motor upon the rotation of the rotating member and permanently in mesh with the toothed wheel,
a housing forming
a longitudinal wall located on the side of the worm diametrically opposed to the toothed wheel, this longitudinal wall extending along the worm at a distance of the latter comprised between 0.001 and 0.01 times the diameter of the worm, and
a first end wall integral with said longitudinal wall, located opposite a first longitudinal end of the worm; and
first energy absorption/dissipation means interposed between said first end wall and said first longitudinal end of the worm, said worm being slidingly mounted in said housing such that said first longitudinal end of the worm comes closer to said first end wall when said worm slides in said housing.

Preferably, said housing comprises:
a central portion having a wall forming a chamber for containing said toothed wheel;
two coaxial tubular extensions, integral with said central portion, forming a longitudinal bore for receiving said worm,
at least one lateral wall extending from one extension to the other extension,
said longitudinal wall being integrally formed with said coaxial extensions and said at least one lateral wall, and said first end wall being formed by a nut screwed in a tapped bore formed by the corresponding extension.

The worm is thus contained within in a bore formed in said housing, this bore being delineated by a continuous wall of the housing extending all around the worm outside the area where the toothed wheel is in mesh with this worm and having a diameter such that said wall is at the immediate vicinity of the peripheral outer edges of the threads of the worm.

This worm is thus maintained in a radial direction with respect to the toothed wheel throughout its length, and is consequently able to take up the stresses exerted to it by the toothed wheel in this same direction without any damage.

This design gives also the advantage to dramatically improve the irreversibility of the gearing worm/toothed wheel, because the worm rub against said longitudinal wall and thus is acting as a permanent brake on his own.

Furthermore, this particularly simple design (few parts, no roller bearings) improves the reliability and is very simple to manufacture.

Preferably, said chamber of said central portion is formed by a bore having a diameter equal to à 0.001 to 0.01 times the diameter of said toothed wheel.

Said wall of said central portion forming said bore thus extends at the immediate vicinity of said toothed wheel.

Preferably, said housing comprises an intermediate wall integral therewith and extending from one of said extensions to the other extension, this intermediate wall comprising an opening through which said toothed wheel meshes with said worm, the edge delineating this opening surrounding the area in which said toothed wheel meshes with said worm.

Preferably, the worm comprises at least one cylindrical portion coaxial with its threaded portion, having said diameter, and the said bore has a diameter equal to the diameter of the worm plus 0.001 to 0.01 times the diameter of the worm, such that said wall delineating said bore is at the immediate vicinity of this or these cylindrical portions.

Preferably, the peripheral outer edges of the threads of the worm are flat viewed in a plane parallel to the axis of the worm.

The threaded portion of the worm may have the same external diameter as the said cylindrical portion, but an appropriated machining of the portion in mesh with the toothed wheel can be done, in anticipation of the worm's bending during lock-up and in order to optimize the hertzian contact pressure distribution throughout the length of the worm.

Preferably, said housing forms a second end wall integral with said longitudinal wall, located opposite the second longitudinal end of the worm, and the system comprises second energy absorption/dissipation means interposed between said second end wall and said second longitudinal end of the worm.

Preferably, the pitch of the thread of the worm is greater than the width of each tooth of the toothed wheel, so that a play exists between this thread and the teeth of the toothed wheel, this play being such that the worm can rotate on 2 to 20° with respect to the toothed wheel when this toothed wheel is fixed in rotation.

In other words, as from a position in which a first lateral flank of a tooth of the toothed wheel is in contact with a first thread of the worm, the worm can rotate on 2 to 20° before the opposed second lateral flank of this tooth comes in contact with a second thread of the worm adjacent said first thread, considering said tooth is fixed in position.

Preferably, said first energy absorption/dissipation means are so located with respect to the worm that a play exists between said first energy absorption/dissipation means and said first longitudinal end of the worm, this play being comprised between 0.005 and 0.05 times the diameter of said worm.

When the device also comprise said second energy absorption/dissipation means, said first and second energy absorption/dissipation means are so located with respect to the worm that a play exists between said first and second energy absorption/dissipation means and said respective first and second longitudinal end of the worm, this play being comprised between 0.005 and 0.05 times the diameter of said worm.

Said energy absorption/dissipation means may comprise at least one resilient means, such as an elastomer spring, interposed between said first or second longitudinal end of the worm and said first or second end wall.

Preferably, the said energy absorption/dissipation means comprise at least one elastomer spring which is made in a material that is permanently deformed when it undergoes forces beyond a predetermined threshold, and which, when deformed, prevents the worm to return to its normal position and thus making impossible the normal use of the safety system.

These absorption/dissipation means may also comprise:
a liquid contained in the space delimited by at least one piston, against which one of said first or second longitudinal end of the worm comes to bear, and
one or more ducts and/or interstices for this liquid to escape upon the sliding of the worm, this or these ducts and/or interstices having restricted flow sections, suitable for allowing the said liquid to escape only over a non-instantaneous time interval.

This liquid may be more or less viscous and/or lubricating, in particular oil, so as to serve also to lubricate the wheel and the worm.

The said piston may in particular be formed by an aforementioned cylindrical portions of the worm.

The said one or more ducts and/or interstices may comprise means for adjusting the flow of liquid, in order to allow the safety system to be adapted to the specificities of a mechanism to be equipped, and/or means for preventing the return of this liquid in order to make it possible to obtain a different damping for each sliding direction of the worm.

BRIEF DESCRIPTION OF THE DRAWINGS

For a better understanding of the invention, it is described again below with reference to the appended schematic drawing showing, by way of non-limiting examples, several embodiments of the safety system to which the invention relates.

FIG. 3 is a longitudinal sectional view;

FIG. 3A is an enlarged view of the encircled detail in FIG. 3;

FIG. 10 is a longitudinal cross-sectional view of a subassembly of the safety system according to the invention, according to a second embodiment;

FIGS. 11 and 12 are longitudinal cross-sectional views of two members forming a part, of this second embodiment;

FIG. 19 shows another embodiment of the safety system according to the invention, in a normal position;

FIG. 20 is an enlarged partial view of the safety system of FIG. 19, in a damping position;

FIGS. 21A and 21B are enlarged partial views of a safety washer of the system of FIG. 19, respectively in its normal, not deformed, shape and in its deformed shape; and FIGS. 22 and 23 are perspective views of the housing of the device according to another embodiment.

FIG. 24 is longitudinal cross-section view of the device according to another embodiment.

DETAILED DESCRIPTION

Figure 1:
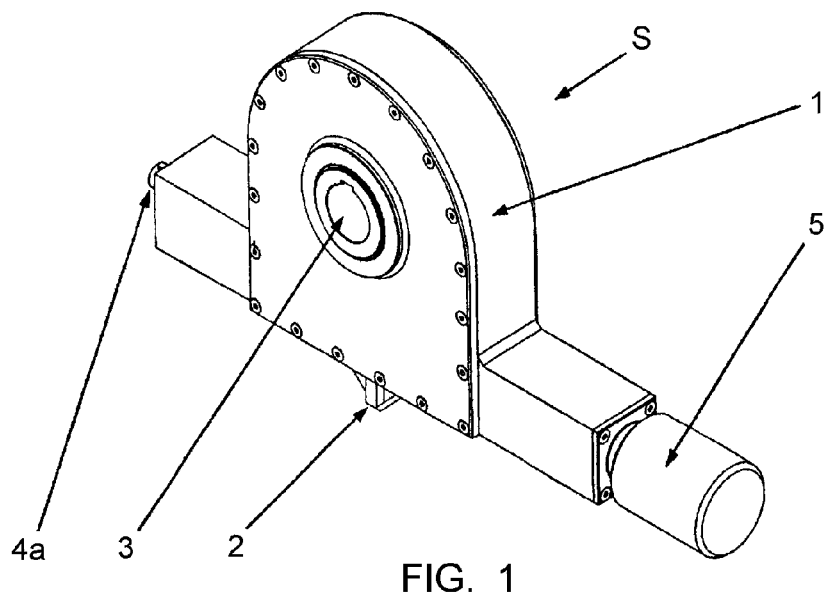
FIG. 1 is an isometric view thereof, according to a first embodiment.
Figure 2:
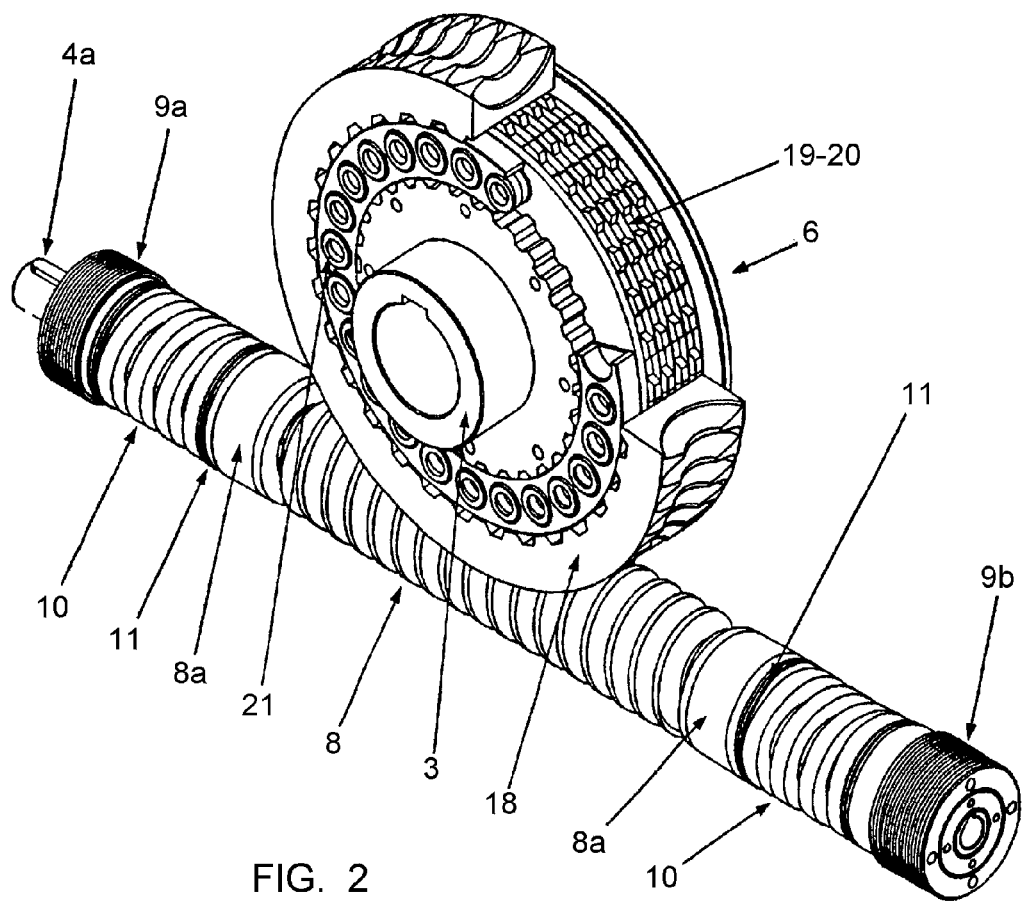
FIG. 2 is an isometric, partially cutaway view of its internal parts.

The parts or elements of one embodiment which are identical or similar in another embodiment will be identified by the same reference numerals and will not again be described.

The safety system S shown in FIGS. 1 to 5 comprises a toothed wheel 6, intended to be connected rotationally with respect to at least one rotating member to be braked (the drum 34 of the winch shown in FIG. 7) and a worm 8, driven rotationally by a motor 5 upon the rotation of the rotating member 34 and permanently in mesh with the toothed wheel 6.

The system S comprises a housing 1 which serves to accommodate the bearings 17 of the shaft 3 of the wheel 6 and the bearings 9a and 9b of the shaft 4 of the worm 8.

One of the ends of the shaft 4 is actuated by the motor 5, while the other end has a stub 4a which can receive a crank or any other removable actuating means (not shown), thus providing a backup means for operating the safety shaft, particularly when its main drive is unavailable. A coupling arm 2 adjoining the housing 1 allows the system S to be fixed to the frame of the apparatus (not shown) on which it is employed.

As shown in FIG. 3, the housing 1 forms a U-shaped wall 1a forming a chamber for containing said toothed wheel 6, two coaxial tubular extensions 1b, integral with the free ends of the lateral branches of said U-shaped wall 1a, forming a longitudinal bore for receiving said worm 8, lateral walls extending from one extension 1b to the other extension 1b, i.e. walls parallel to the plane of the wheel 6, a longitudinal wall 1c located on the other side of the worm 8 with respect to the toothed wheel 6, extending along the worm 8 at a distance of the latter comprised between 0.001 and 0.01 times the diameter of the worm, and a first end wall integral with said longitudinal wall 1c, located opposite a first longitudinal end of the worm 8, this first end wall being formed by a nut 9a screwed in one end of the extension 1b.

Said U-shaped wall 1a has a rounded base part extending along 180° of said toothed wheel 6 on the side of this wheel opposed to said worm 8, this rounded base part having a diameter equal to à 0.001 to 0.01 times the diameter of said toothed wheel 6.

Said intermediate wall 1d is integral with the free ends of the lateral branches of said U-shaped wall 1a and extends from one of said free ends to the other free end, this intermediate wall 1d comprising an opening through which said toothed wheel 6 meshes with said worm 8.

The worm 8 is inserted into a bore formed by said two coaxial tubular extensions 1b of the housing and the lower part of the chamber of this housing containing the toothed wheel. The bore that the housing 1 forms is thus delineated by a continuous wall of the housing extending all around the worm 8 outside the area where the toothed wheel 6 is in mesh with this worm 8. This bore has a diameter equal to the diameter of the worm 6 plus 0.002 to 0.02 times the diameter of this worm 6, such that said wall is at the immediate vicinity of the peripheral edges of the threads of the worm 6.

The worm 8 can slide inside this bore, as well as its shaft 4, to which, in contrast, it is rotationally fixed. Its two ends each have a cylindrical bearing surface 8a, with a diameter slightly less than the bore of the housing 1, which play a dual role of journals and pistons.

The shaft 4 of the worm 8 is supported by two bearings 9a and 9b, which also ensure the axial stoppage 22 and sealing 23 thereof. These same bearings 9a and 9b serve as axial stops for the worm 8, via springs 10 and friction washers 11.

The system S is filled with lubricating liquid L, which occupies the free space of the bore of the housing 1 up to a level shown by a dash line in FIG. 3. In order to move in sliding fashion, the worm 8 must therefore drive away the quantity of liquid L trapped between it and the corresponding bearing 9a, 9b.

The axial speed of the worm 8 is a function of the volume of liquid which is able to escape from this space. It is therefore expedient to create at least one passage which allows the liquid to escape, in a limited way. The housing 1 and/or the worm 8 and/or the shaft 4 of the worm must consequently be configured in an appropriate manner with hollow spaces.

Figure 4A:
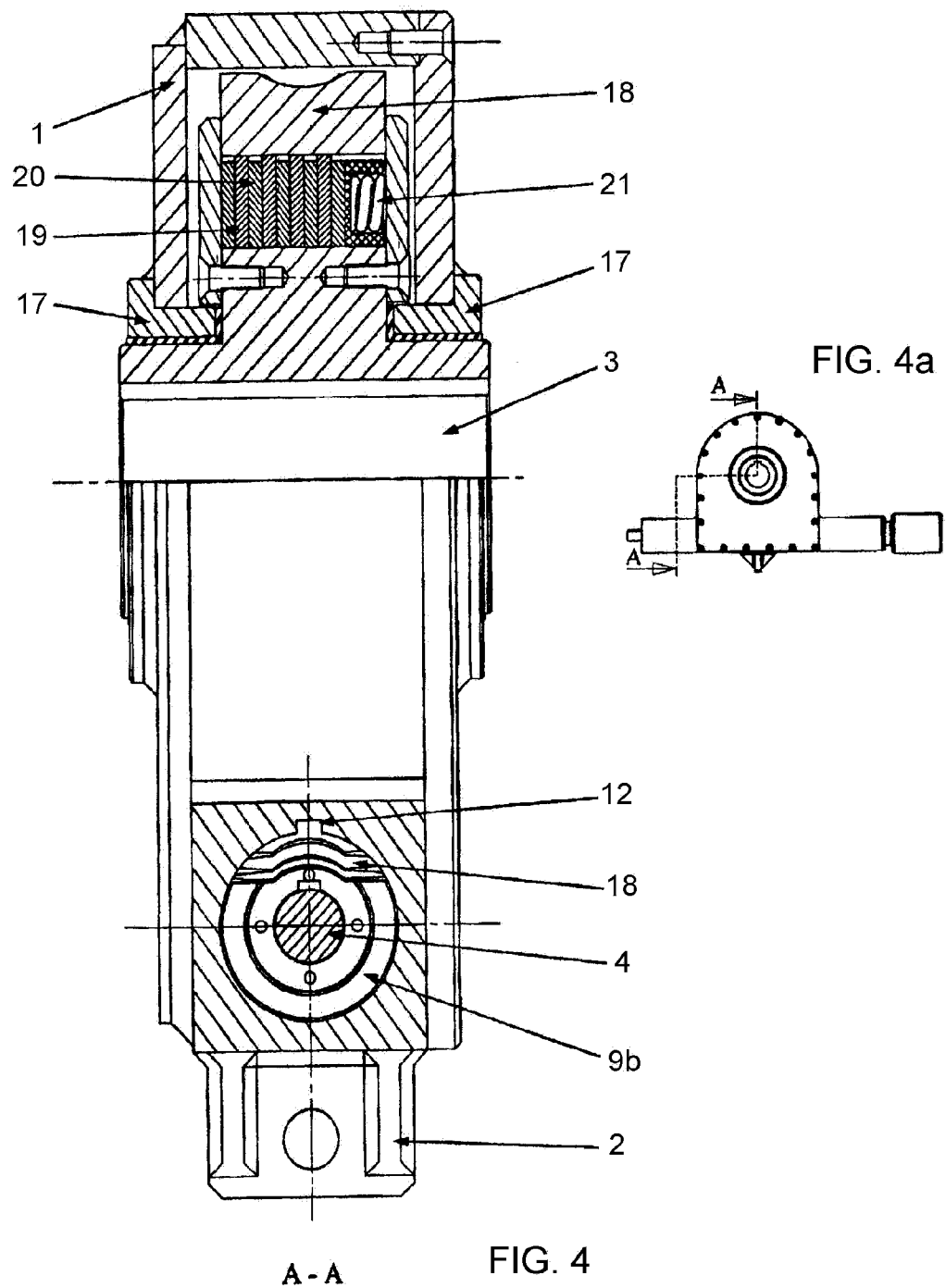
FIG. 4 is a cross-sectional view along the line A-A of FIG. 4A, with the worm removed.

According to the example presented in FIGS. 3 and 4, a groove 12, made along the wall delimiting the bore, allows the liquid to pass towards the rear of the worm 8 when the latter has a tendency to move under the effect of the wheel 6. The groove 12 has a limited section, which may also vary along the bore thereby allowing the resistance to the movement of the worm 8 to be programmed.

Figure 5:
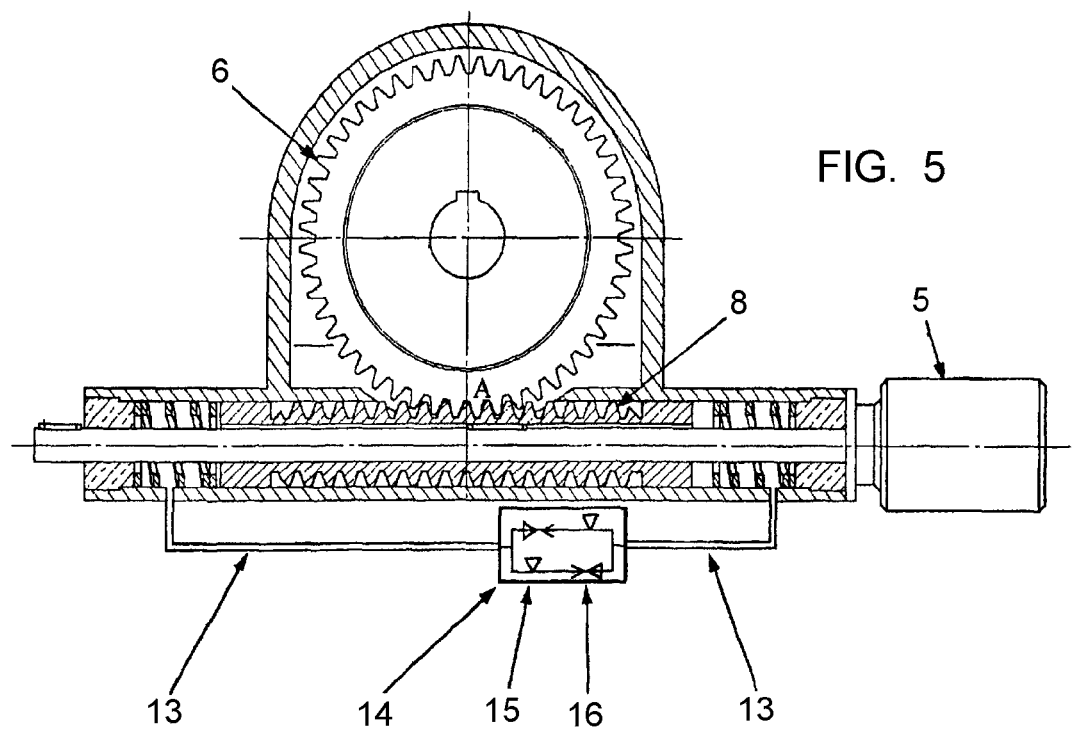
FIG. 5 is a view of a variant, in cross-section.

FIG. 5 shows a variant with adjustable hydraulic damping. The two spaces on either side of the worm 8 communicate via lines 13 outside the housing 1. A housing 14 contains at least one adjusting valve 15. The use of at least one non-return valve 16 makes it possible to obtain a different damping for each sliding direction of the worm 8, depending on whether this valve allows or prevents the flow of fluid.

The shaft 3 of the wheel 6 is supported by its bearings 17, which also ensure the axial stoppage and optionally sealing thereof. The transmission of the torque between the shaft 3 and the toothed ring 18 is effected via the friction in a multi-disc torque limiter composed of discs 19 in mesh with the toothed ring 18, of discs 20 in mesh with the shaft 3 and of an assembly of resilient elements 21 providing the necessary pressure between the discs. Here, the discs 19 and 20 and resilient elements 21 may function as a friction connecting means.

Figure 6A:
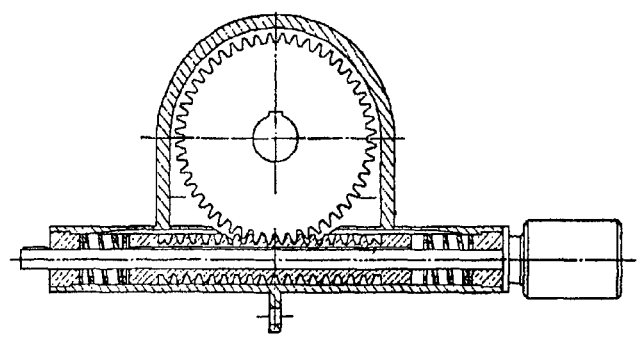
FIGS. 6a to 6b show schematically, in section, embodiment variants.
Figure 6B:
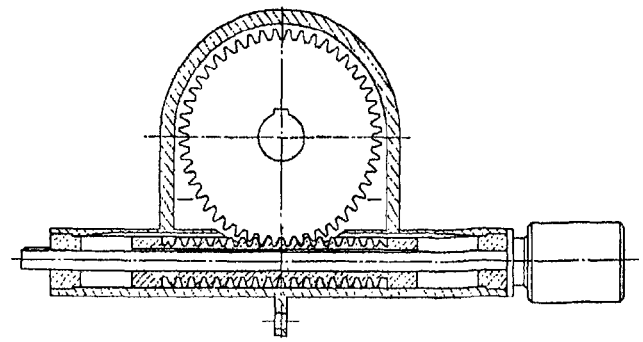

FIGS. 6a and 6b show variants of the system S in which respectively,
  the system S comprises springs 10 and the groove 12 but the wheel 6 is not connected to its shaft by a multi-disc torque limiter 19 to 21 as mentioned above (FIG. 6a);
  the system S comprises only the groove 12 (FIG. 6b);
Any combination of these various energy absorption/dissipation means is possible.

Figure 7:
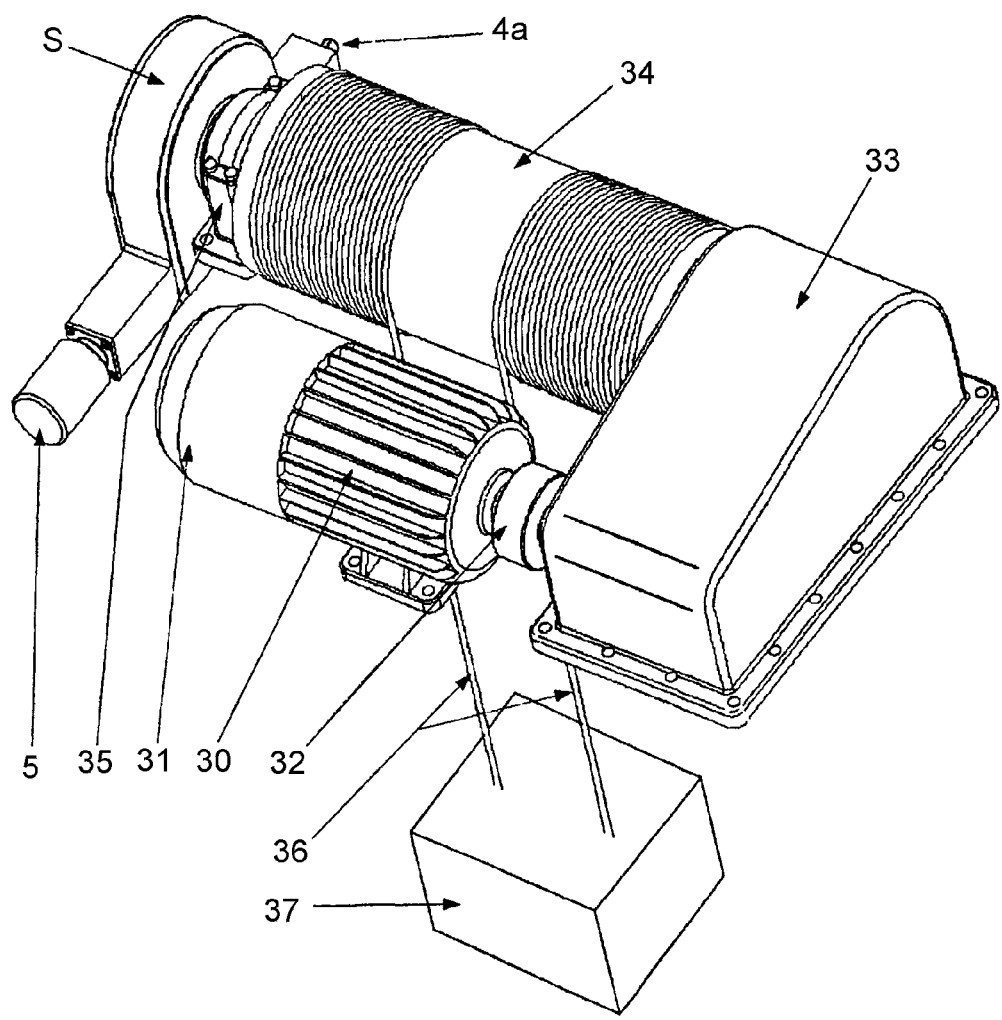
FIG. 7 is an isometric view of a winch with U-shaped kinematic chain, equipped with the system according to the invention.
Figure 8:
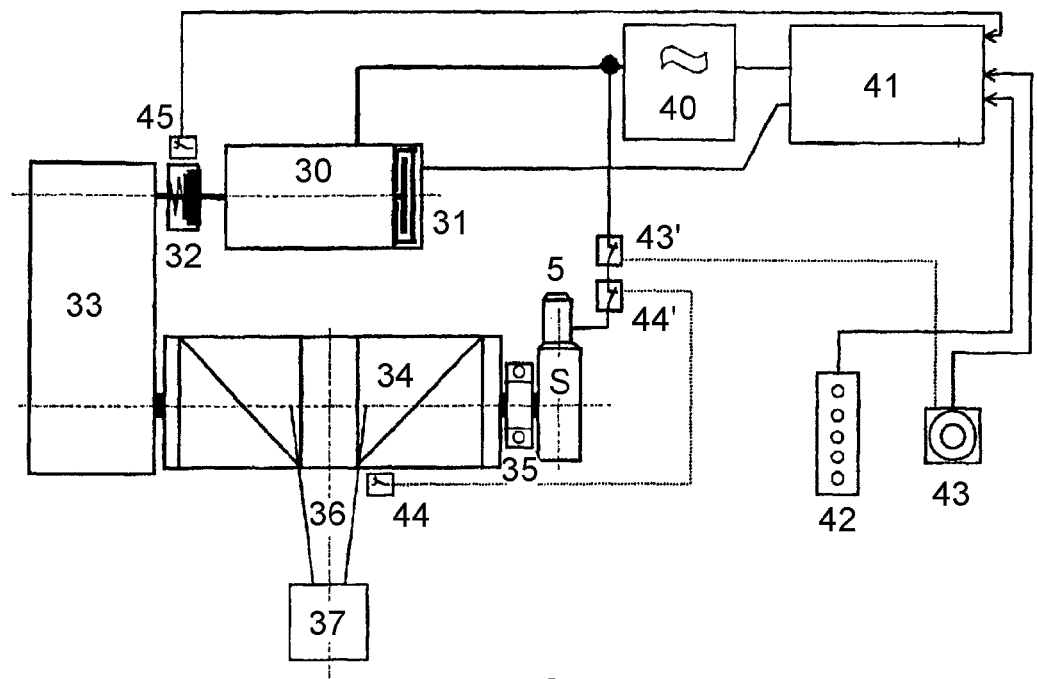
FIG. 8 is a diagram of an example of the connection of the winch to the corresponding electrical part.
Figure 9:
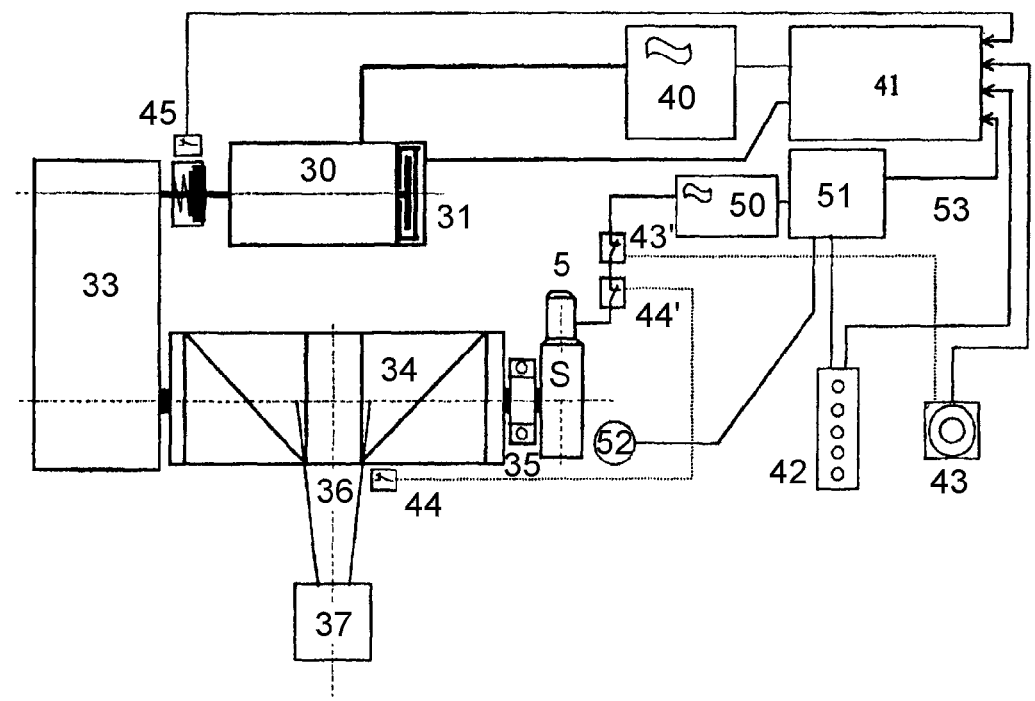
FIG. 9 is a diagram of an example of the connection of the winch to the corresponding electrical part, in a version which is more complex but also offers greater safety than the example of the connection according to FIG. 8.

The application example presented in FIGS. 7 to 9 is given as a guide and without limitation. The lifting of loads is an area very representative of the problems solved by the system S. This example makes it possible to demonstrate the advantages resulting therefrom.

FIG. 7 is an isometric view of the system S applied to a conventional lifting mechanism, with a U-shaped kinematic chain.

The "conventional" part of the mechanism is mounted on a framework (not shown) and consists of an electric motor 30 with integrated brake 31 which drives, by means of an optionally torque-limiting coupling 32, the high-speed shaft of a cylindrical gear speed reducer 33. The winding drum 34 for two cables 36 which suspend the load 37 is supported at one end and is driven directly by the low speed shaft of the speed reducer 33. At the other end of the drum 34, its shaft is supported by a bearing 35 and directly engages with the system S. In this example, the system S is mounted in "floating" fashion on the drum shaft 4 and a reaction arm rotationally locks it with respect to the framework.

The motor 30 and the speed reducer 33 are chosen traditionally, that is to say they provide the power necessary for lifting the nominal load. The same goes for the brake 31, which may of course be separate from the motor.

The motor 5 associated with the system has a torque just sufficient to drive the worm 8 alone and is consequently of very low power, especially compared with the motor 30. The influence of the torque on the rotational speed of the system motor 5 must be as little as possible. The motor 5 may be, for example, an asynchronous AC or parallel DC motor, or a brushless motor, or else a stepping motor.

The safety system is dimensioned with the aim of guaranteeing its withstanding with a total maximum torque comprising:
- the static torque due to the suspended mass 37,
- the dynamic torque due to the deceleration of the suspended mass 37,
- the dynamic torque due to the deceleration of the mass moments of inertia of the rotating parts of the mechanism, excluding the parts optionally decoupled by a torque limiter,
- the torque to which the optional torque limiter 32 is adjusted, referred to the system S.

The system S functions in the following way:
- In normal operation, in the ascending or descending direction, the system transmits a very low torque to the drum: it accompanies the movement without opposing it.
- In the event of a break in the kinematic chain in ascent, the system locks immediately: the drum 34 is stopped.
- In the event of a break in the kinematic chain descent, after the worm 8 has reached the no-load rotational speed of this worm 8 driven by its motor 5, the wheel 6 starts to transmit a torque to the worm 8: the system S locks and the drum 34 is stopped.
- In the event of overspeed in descent or ascent, an electrical failure or slippage of the torque limiter 32, after the worm 8 has reached the said no-load rotational speed, the wheel 6 starts to transmit a torque to the worm 8: the system S locks and the drum 34 is stopped,
- In the event of inconsistency between the direction of rotation of the main motor 30 and the motor 5, the system S locks immediately.
- A mechanical or electrical failure of the system S itself should also lead to its locking. Even in the event of the low-speed shaft breaking on the side of the system S, control of the load 37 is still ensured by the kinematic "power" chain of the winch remaining intact.

Once locked and if the kinematic chain is intact, the system S can be unlocked:
- either by reversing the direction of rotation of the two motors 30 and 5 with respect to the direction of rotation during which the locking occurred,
- or by momentarily reversing the direction of rotation of the motor 30 with respect to the direction of rotation during which the locking occurred, which leads to unlocking and locking of the system S in the opposite direction, and consequently makes it possible to start again in the initial direction if the motors 30 and 5 are restarted in this direction.

Where the kinematic chain is not intact, or in the event of a motor or supply problem, a manual or motor-driven backup drive may be employed on the shaft stub 4a in order to lower the load 31.

The shock due to the more or less sudden locking of the wheel 6/worm 8 gearing is damped by the springs 10 and the flow of liquid into the groove 12, and, also, where appropriate, by the freeing of the pivoting of the wheel 6 with respect to its hub by mutual friction of the discs 19 and 20.

In order to limit the dynamic stresses while reducing the stoppage time in the event of the system locking, a torque limiter 32 may be provided.

The proper functioning of the system requires co-ordination between the starting and the speeds of the main motor 30 and the motor 5. To maintain the system into unlocked state, the worm 8 must transmit torque to the toothed wheel 6. This means that the motor 5 have to tend to rotate the worm 8 faster than the rotation of the main motor 30, calculated throughout the transmission ratios, from main motor 30 to worm 8.

There are several ways of achieving the co-ordination of the motor 5 with the main motor 30. For example, in the case of AC motors or stepping motors, the two motors can be supplied with currents of equal frequency as in the exemplary diagram of FIG. 8, or where the frequencies have a preset fixed relationship between them, it is also possible, depending on the backlashes and the reaction times, that the starting of the motor 30 may have to be delayed with respect to the starting of the motor 5. A variable supply specially developed for the system motor 5 by devices of the "electronic controller" and "programmable controller" type may be advantageously employed. Also, a "smart" motion controller that integrates programmable motion capabilities can be used.

The supply to the system motor 5 may be developed by the apparatus control system from information on the operating parameters of speeds, accelerations, torques, integrity, etc., supplied by appropriate sensors. In this case, the locking of the system may be controlled.

FIG. 8 shows an exemplary embodiment of the control system of the application example. It again shows, schematically and arranged in the same way as in FIG. 7, the main motor 30, the service brake 31, the torque-limiting coupling 32, the speed reducer 23, the drum 34, the lifting cable 36, the load 37, the bearing 35 and the safety system S. The main motor 30 and the system motor 5 are AC motors. They are supplied in parallel by the same frequency varistor 40. The motors 30 and 5, the main speed reducer 33 and the speed-reducing ratio of the system S conform to the rules set out above. The frequency varistor and the service brake are controlled by a programmable controller 41, which processes the information coming from the control station 42, the emergency stop 43, an upper overtravel detector 44 for detecting if the lifting travel is exceeded and a detector 45 for detecting slippage in the torque-limiting coupling 32.

The stoppage of the system motor causes immediate locking of the system and constitutes the emergency stop means. In addition to the automatic triggering of the system as described above, its triggering may be brought about by actuating the emergency stop button 43, by means of one of the contacts of the latter 43' and by the upper overtravel cutoff switch 44 being reached. There is thus a maximum level of safety, since the opening of the contacts 44' and 43' directly guarantees immediate stoppage. In order to further reinforce the safety and protect the main motor 30, which if it continued to be supplied could suffer damage, the information "emergency stop" and "upper overtravel" are likewise transmitted to the controller 41, which cuts the supply to the main motor 30 and activates the service brake 31. Finally, the slippage detector 45 plays a similar role in the case of automatic triggering of the system, by bringing about, via the controller 41, the stoppage of the two motors 30 and 5 and the activation of, the service brake 31.

According to this diagram, the failures which are safely and effectively overcome by employing the safety system are:
- kinematic chain break,
- dynamic unwinding,
- static unwinding,
- overspeed, Moreover, it intervenes advantageously in the processing of the:
- upper overtravel,
- emergency stop.
- two-blocking,
- snag load,
- overload.

However, in the diagram of FIG. 8, there are still risks that the winch might perform uncontrolled movements, since the two motors are supplied in parallel and the information from the control station is not compared with the actual movement of the winch. Indeed, a fault of the control station 42, of the control system in general, which is represented merely by the controller 41 for simplification, but is much more complicated in reality, or of the varistor 40 can lead to unintentional movements, for example inadvertent supplying of the motors 30 and 5 or a start in the wrong direction.

FIG. 9 shows an exemplary diagram which solves this problem. The supply to and speed control of the motor 5 are performed separately here from those of the main motor. The microcontroller 51 and the low-power varistor 50 are dedicated solely to the safety system S. The control station 42 has two channels separated by command. Thus, each of the controllers 41 and 51 processes the commands coming from its own link to the control station. An encoder 52 informs the system controller 51 of the speed and direction of rotation of the drum 34. The system controller 51 is equipped with a self-diagnosis function and informs the controller 41 via the link 53 with the signal "test OK". Here, the varistor 50, the microcontroller 51, and/or the encoder 52 provide a command or control means acting upon the means for driving the rotating members 34, such as the motor 5.

According to this diagram, additional safety features compared with the diagram of FIG. 8 are provided:
- in the event of inconsistency between the commands received by the controller 41 and the controller 51, the motors 30 and 5 are supplied inconsistently. Since the motors 30 and 5 are not co-ordinated, the system looks, except if the fault involves giving a "speed" instruction in the right direction, but abnormally high to the system motor 5,
- the same applies in the event of a failure of one of the two controllers 41 and 51,
- where the system motor 5 receives an abnormally high "speed" instruction, the consequence of which would be to degrade its "overspend" safety role, the information given by the encoder 52 allows the controller 51 to detect the fault and trigger an immediate stoppage.

Another advantage of this diagram is a greater flexibility in the co-ordination of the system motor 5 with the main motor 30, made possible by the separate variable supply to each of the two motors.

FIG. 10 shows another embodiment of adjustable hydraulic means for shock absorbing for the worm 8 when the latter is urged slidably by the toothed wheel.

In this case, the worm 8 is internally hollow and contains a ring 60 secured to it, a tubular member 61, engaged adjustably through this ring 60 and a rod 62 engaged adjustably in the member 61 and blocked relative to it by means of screws 66 and 71.

The tubular member 61 and the rod 62 are more particularly shown in FIGS. 11 and 12.

The part 61 has, at each end, a tapped hole 65 adapted to receive the screws 66 and 71. On the side of one end, it comprises two pairs of radial holes 67 diametrically opposed and a series of radial holes 68 opening on the same side, these holes 67 and 68 passing through its wall. The distance separating, in the longitudinal direction of the members 61, two consecutive holes 68 decreases in a direction away from the holes 67.

The rod 62 has at one end a transverse groove 70 adapted to receive a screwdriver and a throat 69 for a sealing joint. On the side of its other end, it comprises an axial blind hole 72, two pairs of radial holes 73 diametrically opposed and a series of radial holes 74 opening on the same side, these holes 73 and 74 passing through its wall.

Figure 13:
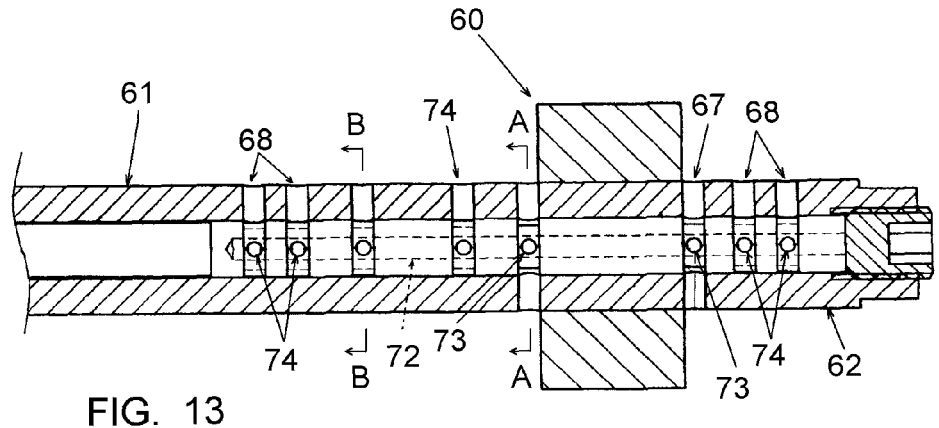
FIGS. 13 to 15 are longitudinal cross-sectional views of members thereof, in three different relative positions.
Figure 14:
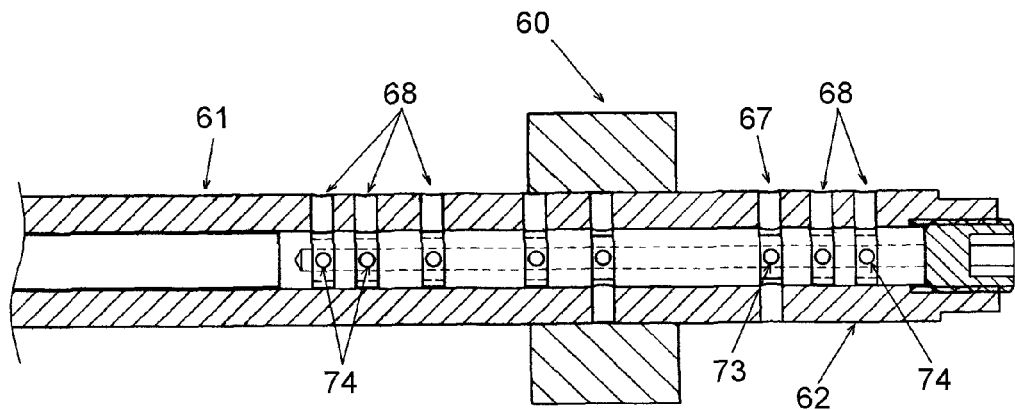
Figure 15:
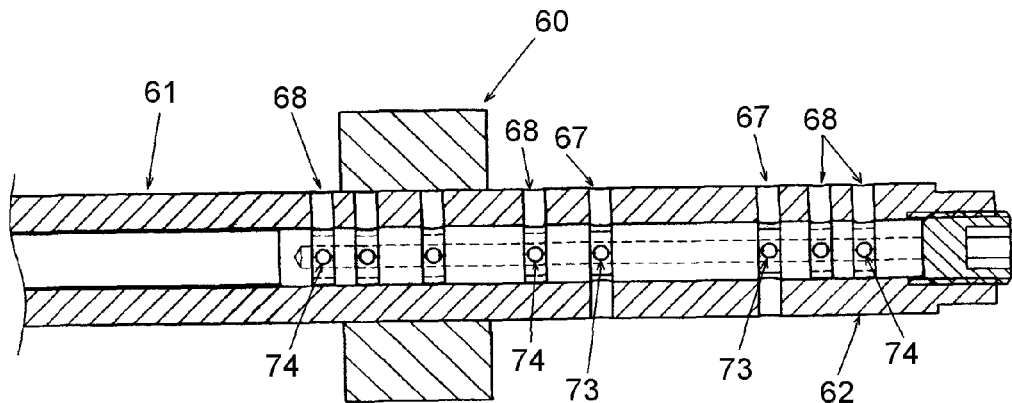

As shown in FIG. 10 and more particularly in FIGS. 13 to 15, each hole 73, 74 is in the same transverse plane as a hole 67, 68 respectively, a corresponding respective hole 67, 68 when the pierced end of the rod 62 bears against the screw 66. Tightening or loosening this screw 66 permits adjusting this position.

Figure 16A:
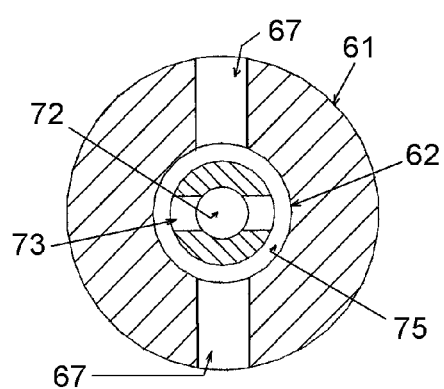
FIG. 16A is a transverse cross-sectional view on the line A-A of FIG. 13.
Figure 16B:
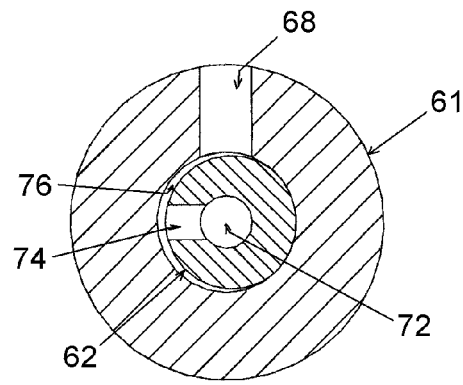
FIG. 16B is a transverse cross-sectional view on the line B-B of FIG. 13

With reference to FIG. 16A, it will be seen that the rod 62 comprises a throat 75 of constant depth, arranged in the same plane as the two holes 73 of a same pair; with reference to FIG. 16B, it will be seen that the rod 62 comprises groove 76 provided in the same plane as each hole 74, this groove 76 extending over a portion of the circumference of the rod 62 and having a variable depth, its greatest depth being facing the opening of the hole 74.

Figure 17A:
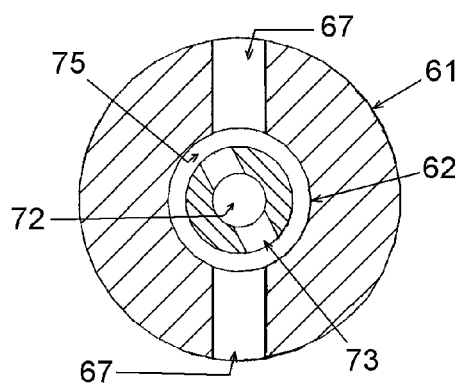
FIG. 17A is a view similar to FIG. 16A in another relative position of the parts.
Figure 17B:
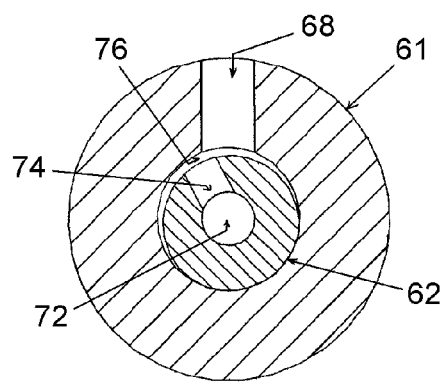
FIG. 17B is a view similar to FIG. 16B of these parts in another relative position.

It will thus be seen, by comparing FIGS. 16B and 17B, that the cross-section of the communication between a hole 68 and the corresponding hole 74 varies according to the angular position of the rod 62 relative to the rod 61. On the other hand, as is seen in FIGS. 16A and 17A, because of the constant depth of the throat 75, the communication cross-section of a hole 73 with the corresponding hole 67 remains constant.

As shown in FIG. 10, the system S comprises moreover a screw 71 that can be screwed into the bore 65 of the unpierced end of the rod 62, to bear against this unpierced end and thereby to immobilize fractionally the rod 62 in a given angular position relative to the member 61, this position having been previously given to the rod 62 with the help of a tool that bears against this rod 62 at the level of the groove 70. The screw 71 is pierced so as to permit the tool to reach the groove 70 without disassembling the screw 71. A screw plug 80 is then emplaced on the housing to improve sealing and to serve as a safety means.

In the absence of pressure on the worm 8 by the toothed wheel 6, the ring 60 is located, relative to the member 61, in the position shown in FIGS. 10 to 13, predetermined by the resilient means located on opposite sides of the worm 8. In the embodiment shown in FIG. 10, these resilient means are Belleville washers 81.

The assembly of holes 67, 68, 73, 74 located on the left side of the ring 60 communicate through the axial hole 72 with the holes 73, 74, 67, 68 located on the right side of this ring.

When the worm 8 is urged slidably, it moves the ring 60 to the left in FIGS. 13 to 15, reducing the number of holes 67, 68, 73, 74 for flow of the oil contained in the left portion of the housing. The holes 67 and 73 are immediately covered (compare FIG. 14), not permitting the flow of oil except through the holes 68 and 74, whose cross-section of communication has been adjusted, as a function of the apparatus to be equipped, by the angular positioning of the rod 62 relative to the member 61, as described above.

The greater the movement of the worm 8 and the greater the number of holes 68, 74 that are exposed reduces rapidly, because of the decrease of the distance separating the consecutive holes in the longitudinal direction, thereby providing a progressive damping of the worm 8.

Figure 18:
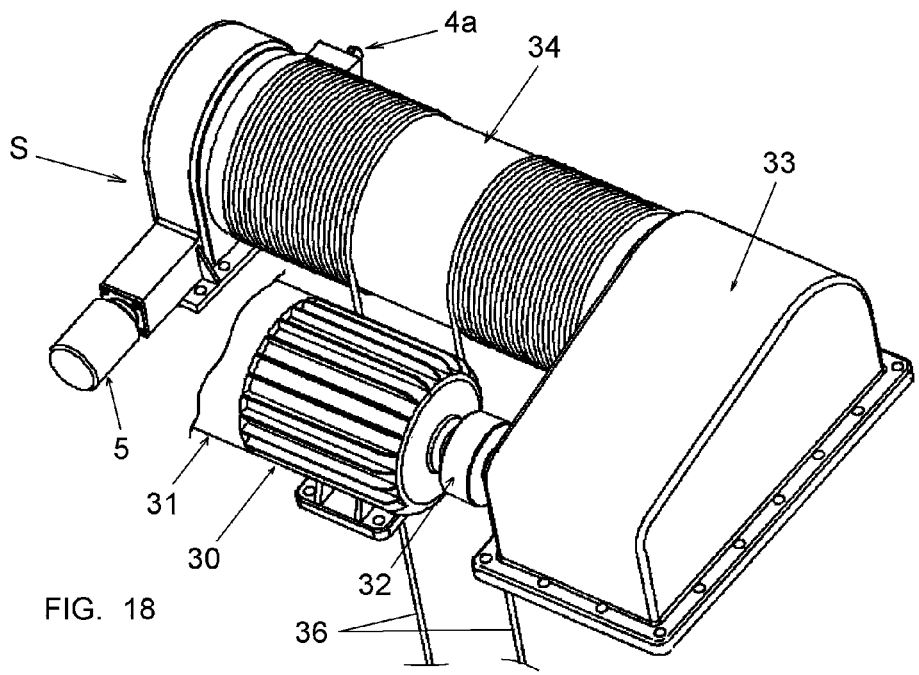
FIG. 18 is a view of the safety system similar to FIG. 7, according to a modified embodiment.

FIG. 18 itself shows a modification relative to the apparatus shown in FIG. 7, such that the safety system S according to the invention can serve directly as a bearing for the drum 34 receiving the cable 36.

FIG. 19 shows another embodiment of hydraulic and resilient means for the worm 8 when the latter is urged slidably by the toothed wheel. This embodiment is optimized for the case when the efforts are oriented mainly in one direction, for example in lifting appliances.

The ring 60 is held by a safety washer 83 and a spring 87. The elastomer springs 85 are held by the small shoulder 86. When the worm is urged slidably, the progressive damping is achieved in the same way as described in FIGS. 10 to 17. The rod 62 and the member 61 are held by the flange 82. When the safety washer 83 reaches the resilient rings 85 (two elastomer springs between metal washers), the force coming from the worm 8 is transmitted to the elastomer springs 85 via the safety washer 83. The safety washer 83 exerts pressure to the elastomer springs 85, thus compressing and deforming them. This is shown on FIG. 20.

After unlocking and returning the worm 8 into the normal position, shown on FIG. 19, the spring 87 will return the safety washer 83 and the piston 84 into their normal positions. FIG. 21A shows the normal shape of the safety washer 83 (the circumferential area 88a is not deformed) and the shoulder 86. In this configuration, the safety washer 83 can pass the shoulder 86 to return into normal position.

If for some reason (unadjusted damping, leak of hydraulic fluid, presence of air, overload, overspeed, etc.) the speed and/or forces exerted on the elastomer springs are bigger than those allowed, it can be useful to memorize this incident, making impossible the further utilization, in order to prevent an accident.

If the pressure exerted by the elastomer springs 86 exceeded the maximum specified capacity, the yield strength of the safety washer 83 will be exceeded, in particular in the specially calculated for this circumferential area 88, where the thickness if lower. Then, the safety washer will take a new, deformed shape. This is shown on FIG. 21B. The plastic deformation of the circumferential area 88b has increased the outer diameter of the safety washer 83 and this later is caught by the shoulder 86. Then, the piston 84 cannot return to its normal position. In this configuration, the means (50, 51, 52, 45) which controls the motor will detect this abnormal situation and will not allow further use of the machine, until inspection and replacement of the damaged parts.

FIGS. 22 and 23 are perspective views of another embodiment of the housing 1 of the device according to the invention, in which a central part 1a1 housing the said toothed wheel 6 and said two coaxial tubular extensions 1b1 are integral with one another, the housing 1 being formed in one piece. The central part 1a1 is formed with a bore 1e1 for receiving the toothed wheel 6, having a diameter that is 0.001 to 0.01 greater than the diameter of the toothed wheel 6.

Said intermediate wall 1d1 is integral with the extensions 1b1 and comprises an opening 1f1 through which said toothed wheel 6 meshes with said worm 8. The edge delineating this opening 1f1 surrounds the area in which said toothed wheel 6 meshes with said worm 8.

FIG. 24 shows that the device includes a sensor 101 of the sliding of the worm 6, actuated by a block 102 attached to the worm 6 having a groove 103. A detection rod of the sensor 101 is caused to move when the rounded end of this detection rod is ejected from said groove 103 as a consequence of the movement of the block 102 moved by the worm 6. The sensor 101 actuates command or control means which in turn actuate on the means for driving the said one or more rotating members.

It goes without saying that the invention is not limited to the embodiment described above by way of example but that, on the contrary, it embraces all embodiment variants thereof which come within the scope of protection defined by the appended claims.

What is claimed is:

1. A safety system, configured to be fitted to a mechanism with one or more rotating members, the safety system comprising:
    a toothed wheel, connected rotationally with respect to at least one rotating member to be braked;
    a worm having a diameter, driven rotationally by a motor upon the rotation of the one or more rotating members and permanently in mesh with the toothed wheel;
    a housing forming
        a longitudinal wall located on the side of the worm diametrically opposed to the toothed wheel, said longitudinal wall extending along the worm at a distance of the worm comprised between 0.001 and 0.01 times the diameter of the worm, and
        a first end wall integral with said longitudinal wall, located opposite a first longitudinal end of the worm; and
    first energy absorption/dissipation means interposed between said first end wall and said first longitudinal end of the worm, said worm being slidingly mounted in said housing such that said first longitudinal end of the worm comes closer to said first end wall when said worm slides in said housing.

2. The safety system according to claim 1, wherein said housing further comprises:
    a central portion having a wall forming a chamber for containing said toothed wheel,
    two coaxial tubular extensions, integral with said central portion, forming a longitudinal bore for receiving said worm,
    at least one lateral wall extending from one extension to the other extension,
    wherein said longitudinal wall being integrally formed with said coaxial extensions and said at least one lateral wall, and said first end wall being formed by a nut screwed in a tapped bore formed by the corresponding extension.

3. The safety system according to claim 2, wherein said chamber of said central portion is formed by a bore having a diameter equal to the diameter of the toothed wheel in addition to 0.001 to 0.01 times the diameter of said toothed wheel.

4. The safety system according to claim 2, wherein said housing comprises an intermediate wall integral therewith and extending from one of said extensions to the other extension, said intermediate wall comprising an opening through which said toothed wheel meshes with said worm, the edge delineating said opening surrounding the area in which said toothed wheel meshes with said worm.

5. The safety system according to claim 1, wherein the worm comprises at least one cylindrical portion coaxial with its threaded portion, having said diameter, and
    the bore has a diameter equal to the diameter of the worm plus 0.001 to 0.01 times the diameter of the worm, such that said wall delineating said bore is at the immediate vicinity of the at least one cylindrical portion.

6. The safety system according to claim 1, wherein the peripheral outer edges of the threads of the worm are flat viewed in a plane parallel to the axis of the worm.

7. The safety system according to claim 1, wherein said housing forms a second end wall integral with said longitudinal wall, located opposite the second longitudinal end of the worm, and
    the system comprises second energy absorption/dissipation means interposed between said second end wall and said second longitudinal end of the worm.

8. The safety system according to claim 7, wherein said first and second energy absorption/dissipation means are so located with respect to the worm that a play exists between said first and second energy absorption/dissipation means and said respective first and second longitudinal end of the worm, the play being comprised between 0.005 and 0.05 times the diameter of said worm.

9. The safety system according to claim 1, wherein said energy absorption/dissipation means comprise at least one resilient means, the at least one resilient means being an elastomer spring, interposed between said first or second longitudinal end of the worm and said first or second end wall.

10. The safety system according to claim 9, wherein said energy absorption/dissipation means comprise at least one elastomer spring which is made in a material that is permanently deformed when the material undergoes forces beyond a predetermined threshold, and which, when deformed, prevents the worm to return to a normal position of the worm and thus making impossible the normal use of the safety system.

11. The safety system according to claim 1, wherein said energy absorption/dissipation means comprise:
a liquid contained in the space delimited by at least one piston, against which one of said first or second longitudinal end of the worm comes to bear, and
one or more ducts and/or interstices for said liquid to escape upon the sliding of the worm, said one or more ducts and/or interstices having restricted flow sections, suitable for allowing the liquid to escape only over a non-instantaneous time interval.

12. The safety system according to claim 11, wherein the said one or more ducts and/or interstices comprise means for adjusting the flow of liquid.

13. The safety system according to claim 12, wherein the means for adjusting the flow rate of the liquid comprise a ring secured to the worm, a tubular member, engaged adjustably through this ring and a rod engaged adjustably in the tubular member, the tubular member and the rod having radial holes communicating with each other, the rod having grooves extending in the circumferential direction and of variable depth, and being adapted to be disposed in a predetermined angular position relative to the tubular member.

14. The safety system according to claim 11, wherein the said one or more ducts and/or interstices comprise means for preventing the return of the liquid, which make it possible to obtain a different damping for each sliding direction of the worm.

15. The safety system according to claim 1, further comprising sensors or detectors of the sliding of the worm, which actuate command or control means which act on the means for driving the one or more rotating members.

16. The safety system according to claim 1, wherein said energy absorption/dissipation means comprise friction connecting means between the toothed wheel and a hub of the toothed wheel or between the toothed wheel and the shaft receiving the wheel, freeing the pivoting of the wheel with respect to the hub beyond a certain torque threshold, with friction.

17. The safety system according to claim 1, further comprising an electronic controller configured to control the maximum speed of the motor to actuate the worm.

18. The safety system according to claim 17, wherein a supply to the motor and the control of the speed thereof are performed separately from those of the motor of the mechanism, by means of an electronic controller and a controller having an independent link to the control station of the mechanism, said control station delivering redundant information to the said controller.

19. The safety system according to claim 1, wherein the pitch of the thread of the worm is greater than the width of each tooth of the toothed wheel, so that a play exists between the thread and the teeth of the toothed wheel, the play being such that the worm can rotate on 2 to 20° with respect to the toothed wheel when the toothed wheel is fixed in rotation.

20. The safety system according to claim 1, wherein said first energy absorption/dissipation means are so located with respect to the worm that a play exists between said first energy absorption/dissipation means and said first longitudinal end of the worm, the play being comprised between 0.005 and 0.05 times the diameter of said worm.

* * * * *